US011385637B2

(12) United States Patent
Mehra et al.

(10) Patent No.: US 11,385,637 B2
(45) Date of Patent: Jul. 12, 2022

(54) APPARATUS FOR DETERMINING OPERATOR AWARENESS AND FOR INITIATING PRECAUTIONARY MEASURES ON A ROBOTIC VEHICLE

(71) Applicant: HUSQVARNA AB, Huskvarna (SE)

(72) Inventors: Rajinder Mehra, Johanneshov (SE); Tommy Olsson, Mölndal (SE)

(73) Assignee: HUSQVARNA AB, Huskvarna (SE)

( * ) Notice: Subject to any disclaimer, the term of this patent is extended or adjusted under 35 U.S.C. 154(b) by 315 days.

(21) Appl. No.: 16/345,362

(22) PCT Filed: Oct. 25, 2017

(86) PCT No.: PCT/SE2017/051047
§ 371 (c)(1),
(2) Date: Apr. 26, 2019

(87) PCT Pub. No.: WO2018/080383
PCT Pub. Date: May 3, 2018

(65) Prior Publication Data
US 2019/0250605 A1     Aug. 15, 2019

(30) Foreign Application Priority Data
Oct. 28, 2016   (SE) .................................... 1651426-7

(51) Int. Cl.
*G05D 1/00* (2006.01)
*B25J 19/06* (2006.01)
(Continued)

(52) U.S. Cl.
CPC .......... *G05D 1/0055* (2013.01); *B25J 13/006* (2013.01); *B25J 13/065* (2013.01);
(Continued)

(58) Field of Classification Search
CPC ............... G05D 1/0055; G05D 1/0033; G05D 2201/0202; B25J 19/06; B25J 13/006;
(Continued)

(56) References Cited

U.S. PATENT DOCUMENTS

| 8,428,791 B2 * | 4/2013 | Carlsson .................. G05G 1/02 701/2 |
| 2004/0112466 A1 | 6/2004 | Roth et al. |

(Continued)

FOREIGN PATENT DOCUMENTS

| EP | 1 510 403 A2 | 3/2005 |
| GB | 2 215 421 A | 9/1989 |

(Continued)

OTHER PUBLICATIONS

"Innovative Sensoria Socks for Runners Now Available," retreived from Internet URL: http://iot.do/sensoria-socks-runners-available-2015-05 on May 14, 2015, pp. 1-8.

(Continued)

*Primary Examiner* — Nga X Nguyen
(74) *Attorney, Agent, or Firm* — Burr & Forman LLP

(57) ABSTRACT

An apparatus (e.g., robotic vehicle, control device, headpiece, etc.) including processing circuitry (110) configured to receive robotic-vehicle-positioning-information indicative of robotic vehicle position data of a robotic vehicle (20) transiting a work area at one or more locations on the work area; receive operator-positioning-information indicative of operator position data of an operator controlling the robotic vehicle (20); generate a virtual line-of-sight vector (70) based on the operator-positioning-information; generate a virtual sight area (80) based on the virtual line-of-sight vector (70) and a predetermined sight area parameter; determine if the virtual sight area (80) intersects with the robotic-vehicle-positioning-information; and initiate one or more
(Continued)

precautionary measures when the virtual sight area (80) does not intersect with the robotic-vehicle-positioning-information.

20 Claims, 5 Drawing Sheets

(51) Int. Cl.
 B25J 13/00 (2006.01)
 B25J 13/06 (2006.01)
 F16P 3/14 (2006.01)
 E04G 23/08 (2006.01)
(52) U.S. Cl.
 CPC ............... *B25J 19/06* (2013.01); *F16P 3/147* (2013.01); *G05D 1/0033* (2013.01); *E04G 23/08* (2013.01); *G05D 2201/0202* (2013.01)
(58) Field of Classification Search
 CPC . B25J 13/065; F16P 3/147; F16P 3/00; E04G 23/08; E02F 9/205; E02F 5/145; E02F 3/96; G01S 19/13; G01S 3/143; G01S 5/0284; G01S 5/14; G01S 13/751; G01S 17/88; G01S 19/51; G05B 19/409
 See application file for complete search history.

(56) References Cited

U.S. PATENT DOCUMENTS

| 2006/0271263 | A1* | 11/2006 | Self ........................ G01S 3/143 701/50 |
| 2011/0003665 | A1 | 1/2011 | Burton et al. |
| 2014/0135592 | A1 | 5/2014 | Ohnemus et al. |
| 2016/0086386 | A1* | 3/2016 | Son ...................... G02B 27/017 345/633 |
| 2018/0102035 | A1* | 4/2018 | Trishaun ................ G08B 21/22 |
| 2020/0023740 | A1* | 1/2020 | Bystedt ................... B60L 50/53 |

FOREIGN PATENT DOCUMENTS

| GB | 2 462 590 A | 2/2010 |
| WO | 2008/116595 A2 | 10/2008 |
| WO | 2013/134615 A1 | 9/2013 |

OTHER PUBLICATIONS

"Sensoria Smart Sock Fitness Tracker," retreived from Internet URL: https://www.indiegogo.com/projects/sensoria-smart-sock-fitness-tracker on May 14, 2015, pp. 1-19.
"Visualizing Strategy,", retreived from Internet URL:http://archive.papoirier.org/projects/visualizing_strategy.php, pp. 1-9 (Sep. 2008).
Dempsey, C., "Smart Tree Logging with Remote Sensing" retreived from Internet URL: http://www.gislounge.com/smart-tree-logging-remote-sensing/, published on Oct. 21, 2014 , pp. 1-2.
Elgan, M., "15 mysteries about the Moto 360 smartwatch," retreived from Internet URL: https://www.computerworld.com/article/2488940/15-mysteries-about-the-moto-360-smartwatch.html, published on Mar. 22, 2014, pp. 1-10.
International Search Report and Written Opinion for International Application No. PCT/SE2017/051047 dated Feb. 6, 2018.
International Type Search Report for Swedish Application No. 1651426-7 dated Jun. 22, 2017.
Lammeren, R., et al. , "MSc thesis subject: Forest Management Marteloscope as augmented reality.," retreived from Internet URL: https://www.wageningenur.nl/en/article/GRSthesis2014Lammeren4.htm on May 6, 2019, pp. 1-3.
Meyer. S., "Nike+ SportWatch GPS Review," retreived from Internet URL: http://www.technologyguide.com/review/nike-sportwatch-gps-review/, published on May 5, 2013, pp. 1-11.
Prof. Rossmann, J., et al., "Navigation of Mobile Robots in Natural Environments: Using Sensor Fusion in Forestry," Journal of Systemics, Cybernetics and Informatics, vol. 8, No. 3, pp. 67-71 (2010).
Rahul, R., "Motorola Moto 360 Smartwatch Update Brings New Watch Faces, Customised Moto Body Health App: Check It Out Now," retreived from Internet URL: https://www.ibtimes.co.uk/update-motorola-moto-360-smartwatch-brings-new-watch-faces-customised-moto-body-health-app-check-1473973, published on Nov. 10, 2014, pp. 1-2.
Ranta, P., "Possibilities to Develop Forest Machine Simulator Based Education With Technology," retreived from Internet URL: http://matriisi.ee.tut.fi/simumedia_www/Seminaari/Presentations/Ranta_presentation.pdf, pp. 1-18 (Nov. 22, 2014).
Ranta, P.,"Possibilities to Develop Forest Machine Simulator Based Education With Technology," retreived from Internet URL: http://matwww.ee.tut.fi/simumedia_www/Seminaari/Abstraktit/Simulator_research_technology_Ranta_101104.doc, pp. 1-4 (Nov. 10, 2014).
Rossman, J., et al., "Simulation in the Woods: From Remote Sensing Based Data Acquisition and Processing to Various Simulation Applications," Proceedings of the 2011 Winter Simulation Conference (WSC), pp. 984-996 (Dec. 11-14, 2011).

* cited by examiner

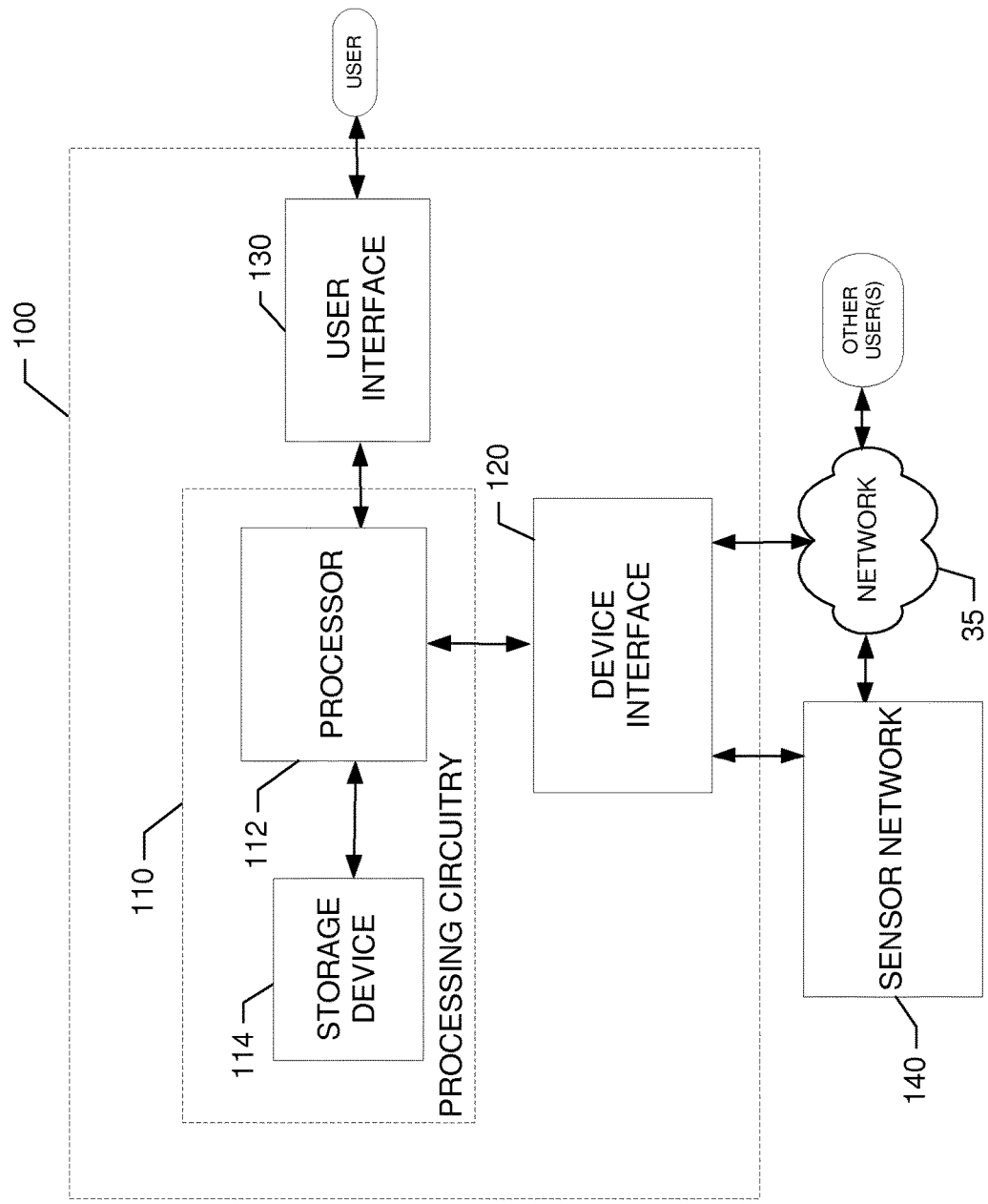

APPARATUS FOR DETERMINING OPERATOR AWARENESS AND FOR INITIATING PRECAUTIONARY MEASURES ON A ROBOTIC VEHICLE

TECHNICAL FIELD

Example embodiments generally relate to robotic devices and operator devices, which may be configured to have or provide operator awareness to mitigate or prevent operation of a robotic vehicle when the operator is not at least looking in the general direction of the robotic vehicle being controlled.

BACKGROUND

Construction equipment includes such devices as saws, drills, generators, nail guns, demolition robots, and the like. These devices are often used to perform tasks that inherently produce debris, and they are also inherently required to be mobile (e.g. a robotic vehicle or mounted on a robotic vehicle). Accordingly, these devices are typically made to be relatively robust and capable of handling difficult work in hostile environments, while balancing the requirement for mobility. However, these devices typically also include some form of working assembly that is capable of cutting work pieces, drilling holes, shooting nails or rivets, demolishing structures, or the like. Thus, these devices have the capability to be sources of risk for damage to equipment or people.

In some construction sites, robotic devices may be particularly suited due to the harsh working conditions and locations which may not be practical and/or safe for individuals. In such construction sites, robotic vehicles, such as demolition robots, may be deployed. Demolition robots, however, may be capable of causing great amounts of unintended damaged if the operator is distracted or inattentive. Demolition robots may also cause unintended damage to a structure if the demolition robot is not driven precisely in restrictive areas such as, hallways, stairwells, or the like.

BRIEF SUMMARY OF SOME EXAMPLES

Some example embodiments may therefore provide an apparatus such as a robotic vehicle (e.g., a demolition robot) or an operator device (e.g., an operator headpiece, operator shirt, operator vest, operator control device, etc.) that employs a capability or capabilities for monitoring and/or determining operator awareness to mitigate or prevent operation of a robotic vehicle when the operator is not at least looking in the general direction of the robotic vehicle being controlled. In this regard, the apparatus may be considered to have awareness of the operator's attentiveness to watching and/or operating the robotic vehicle. This awareness of the operator's attentiveness may enable the apparatus to prevent operation of the vehicle in a reckless manner which may result in unintended damage and/or destruction of physical structures or injuring a person. For example, the apparatus may be configured to automatically power off the robotic vehicle and/or at least initiate one or more warnings upon recognition of an actual or apparent lack of visual observation of the robotic vehicle by its operator. Additionally or alternatively, the apparatus may be configured to determine operator-inactivity and initiate one or more warnings and/or power off the robotic vehicle. For example, the apparatus may make a determination of operator-inactivity by monitoring the operator's position relative to a change in time. For instance, a recognition that the operator's position has remained the same for a predetermined period of time may indicate that the operator has been incapacitated or that the operator has simply placed the operator's equipment providing data regarding the operator's position on a structure proximate the robotic vehicle in an attempt to circumvent the system's capability to have an awareness of the operator's attentiveness. In such circumstances, for example, the apparatus may further be configured to initiate a one or more warnings and/or power off the robotic vehicle.

In an example embodiment, an apparatus such as a robotic vehicle (e.g., a demolition robot) or an operator device (e.g., an operator headpiece, operator shirt, operator vest, operator control device, etc.) is provided. The apparatus may include processing circuitry configured to receive robotic-vehicle-positioning-information indicative of robotic vehicle position data of a robotic vehicle transiting a work area at one or more locations of the work area and to receive operator-positioning-information indicative of operator position data of an operator controlling the robotic vehicle. The processing circuitry may further be configured to generate a virtual line-of-sight vector based on the operator-positioning-information, generate a virtual sight area based on the virtual line-of-sight vector and a predetermined sight area parameter, and determine if the virtual sight area intersects with the robotic-vehicle-positioning-information. In some example embodiments, the processing circuitry may further be configured to initiate one or more precautionary measures when the virtual sight area does not intersect with the robotic-vehicle-positioning-information.

In another example embodiment, a method of operating an apparatus such as a robotic vehicle (e.g., a demolition robot) or an operator device (e.g., an operator headpiece, operator shirt, operator vest, operator control device, etc.) while monitoring and/or determining operator awareness is provided. The method according to some example embodiments may include receiving robotic-vehicle-positioning-information indicative of robotic vehicle position data of a robotic vehicle transiting a work area at one or more locations of the work area and receiving operator-positioning-information indicative of operator position data of an operator controlling the robotic vehicle. In some example embodiments, the method may further comprise generating, via processing circuitry, a virtual line-of-sight vector based on the operator-positioning-information and generating, via processing circuitry, a virtual sight area based on the virtual line-of-sight vector and a predetermined sight area parameter. In some example embodiments, the method may further comprise determining, via processing circuitry, if the virtual sight area intersects with the robotic-vehicle-positioning-information. In some example embodiments, the method may further comprise initiating, via processing circuitry, one or more precautionary measures when the virtual sight area does not intersect with the robotic-vehicle-positioning-information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 illustrates a block diagram of one example of onboard electronics or processing circuitry that may be used in connection with employment of an example embodiment;

DETAILED DESCRIPTION

Figure 1:
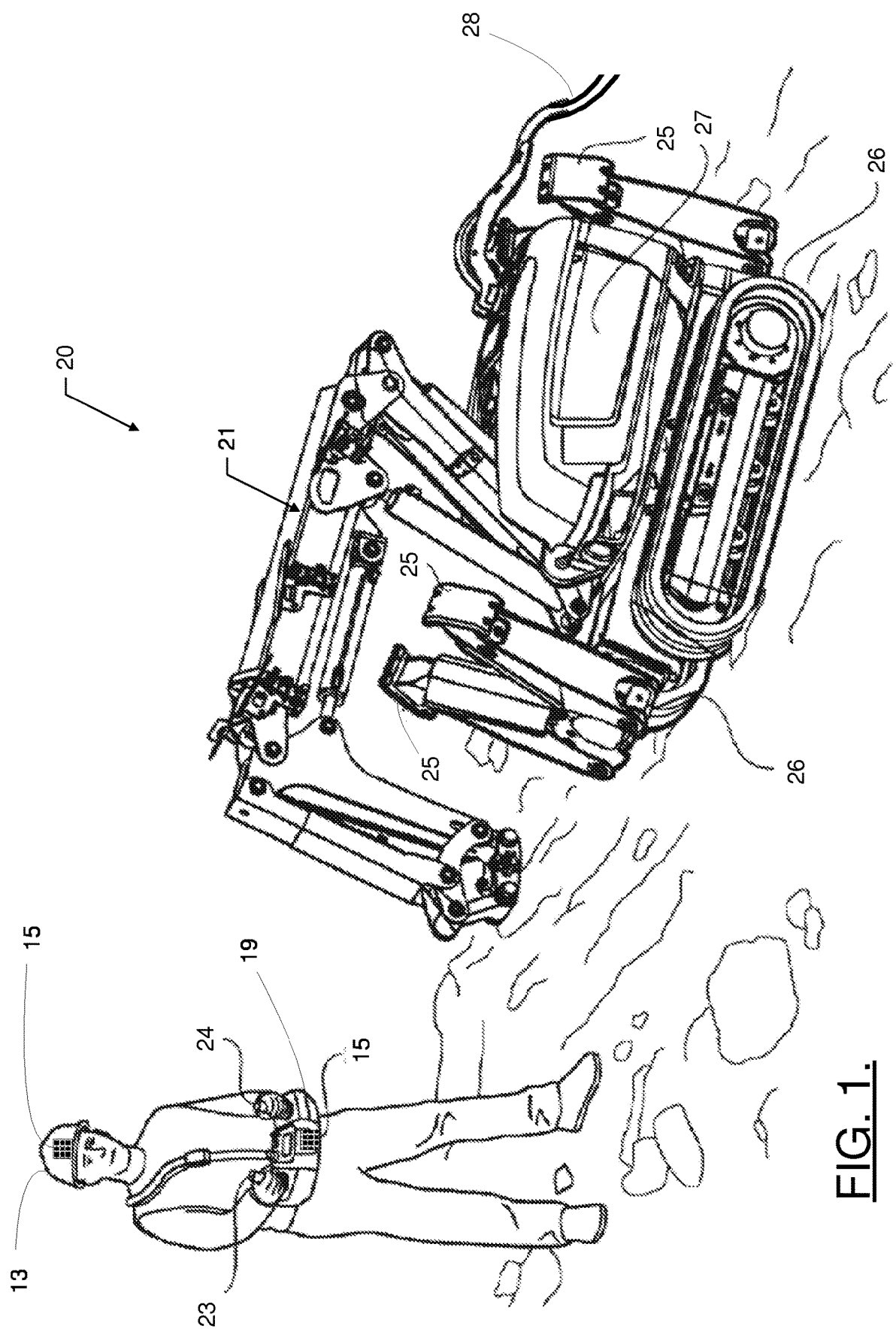
FIG. 1 illustrates an operator controlling the operation of a robotic vehicle (e.g., a demolition robot) according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

In an example embodiment, an apparatus such as a robotic vehicle (e.g., a demolition robot) or an operator device (e.g., an operator headpiece, operator shirt, operator vest, operator control device, etc.) is provided. The apparatus may include processing circuitry configured to receive robotic-vehicle-positioning-information indicative of robotic vehicle position data of a robotic vehicle transiting a work area at one or more locations of the work area and to receive operator-positioning-information indicative of operator position data of an operator controlling the robotic vehicle. The processing circuitry of the apparatus may further be configured to generate a virtual line-of-sight vector based on the operator-positioning-information, generate a virtual sight area based on the virtual line-of-sight vector and a predetermined sight area parameter, and determine if the virtual sight area intersects with the robotic-vehicle-positioning-information. In some example embodiments, the processing circuitry may further be configured to initiate one or more precautionary measures when the virtual sight area does not intersect with the robotic-vehicle-positioning-information. In some example embodiments, the operator position data may comprise at least a first position data point associated with a front position sensor directly or indirectly attached to a front portion of the operator's headpiece (for example) and a second position data point associated with a rear position sensor directly or indirectly attached to a rear portion of the operator's headpiece (for example). In some example embodiments, the operator position data may comprise at least a first position data point associated with a front position sensor directly or indirectly attached to a front portion of the operator's control device and a second position data point associated with a rear position sensor directly or indirectly attached to a rear portion of the operator's control device. In some embodiments, the operator position data may comprise data from position sensors located on both the operator's headpiece and, for example, an operator's control device. In this regard, the processing circuitry may be configured to generate and/or define the virtual line-of-sight vector by a virtual direction formed from the rear sensor through the front sensor. In some embodiments, a first virtual line-of-sight vector may be generated or defined in association with the operator's headpiece and a second virtual line-of-sight vector may be generated or defined in association with an operator's control device.

FIG. 1 illustrates an operator controlling the operation of a robotic vehicle (e.g., a demolition robot) according to an example embodiment. As shown in FIG. 1, the robotic vehicle includes a demolition robot 20 including a plurality of outriggers (e.g., support legs) 25 which may extend and retract to secure and/or stabilize the demolition robot prior to and/or during operation of the demolition robot 20. The outriggers 25 are illustrated as being in a fully retracted position in FIG. 1. The demolition robot 20 may further include caterpillar tracks 26 configured to move the robotic vehicle 20 across a variety of landscapes (e.g., debris, inclined surfaces, stairs, etc.) and a rotating tower 27. The demolition robot 20 may also include a control arm 21, which may be moved to engage a variety of working elements and/or perform a variety of work-tasks. In the example embodiment illustrated in FIG. 1, the demolition robot 20 is electrically powered via an electrical power cord 28. Each of the foregoing features of the demolition robot 20 may be remotely controlled by an operator interfacing with a remote control device 19 including, for example, a first control stick 23 and a second control stick 24. The remote control device may also include a variety of switches and/or buttons, although not shown, which may be used in conjunction with the control sticks 23,24 to control operation of each of the functionally operational features of the demolition robot 20. As shown in FIG. 1, the remote control device 19 may also include a position sensor network 15 of, for example, one or more position sensors (e.g., front and rear position sensors). The operator may additionally or alternatively be outfitted with a headpiece 13 (e.g., hard hat, helmet, cap, etc.) or other item of clothing which includes a position sensor network 15 of, for example, one or more position sensors (e.g., front and rear position sensors). In accordance with certain example embodiments, the one or more position sensors of the position sensor network 15 may emit signal(s) (e.g., electrical signals) which may be directly or indirectly recognized by the demolition robot 20 as well as provide a basis for determining in what general direction the operator's body is facing and/or looking. In this regard, the multiplicity of position sensor networks 15 may comprise an operational redundancy or provide greater detail concerning the operator's attentiveness. In this regard, the position sensor network of the remote control device 19 may indicate in which direction the body of the operator is facing, while the position sensor network of the headpiece 13 may indicate in which direction the operator's head is facing. In some example embodiments, the demolition robot 20, for example, may include onboard circuitry (as illustrated in FIG. 2) including processing circuitry configured to perform a variety of tasks to determine and/or monitor the operator's awareness to mitigate or prevent operation of the robotic vehicle when the operator is not at least looking in the general direction of the robotic vehicle 20.

Figure 2:
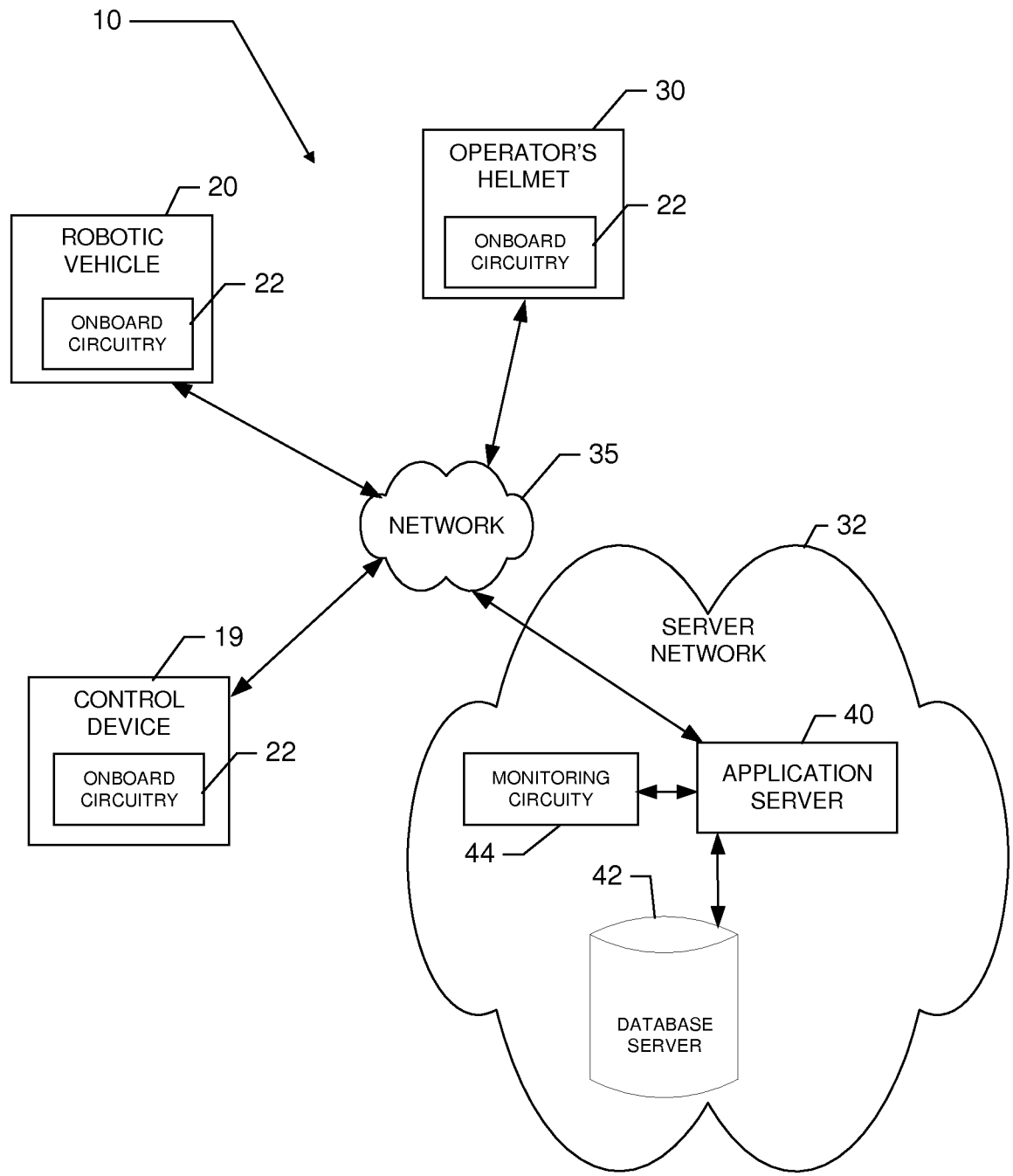
FIG. 2 illustrates a perspective view of a block diagram of a system according to an example embodiment.

FIG. 2 illustrates a generic example of a system in which a plurality of operations-devices, namely a control device 19, a robotic vehicle (e.g., demolition robot) 20, and/or an operator's headpiece 30, may utilize a network for the performance of monitoring and/or determining operator awareness to mitigate or prevent operation of a robotic vehicle when the operator is not at least looking in the general direction of the robotic vehicle. As shown in FIG. 2, a system 10 according to an example embodiment may include a robotic vehicle 20 and a control device 19 and/or an operator's headpiece 30. Notably, although FIG. 2 illustrates three (3) operations-devices 19, 20, 30, it should be appreciated that less or many more operations-devices may be included in some embodiments and thus, the three (3) operations-devices 19, 20, and 30 of FIG. 2 are simply used to illustrate a multiplicity of operator devices (e.g., control device 19, operator's helmet 30, etc.) in conjunction with the robotic vehicle 20 and the number of operator devices is in no way limiting to other example embodiments. In this regard, example embodiments are scalable to inclusion of any number of operator devices (e.g., control device 19, operator's helmet 30, etc.) being tied into the system 10. Moreover, it should be appreciated that FIG. 2 illustrates one example embodiment and that the architecture of various example embodiments may vary. For example, independently any or each of the operations-devices (e.g., control device 19, robotic vehicle 20, and operator's helmet 30) may, in some cases, include sensory, computing and/or communication devices associated with the different operations-devices (e.g., control device 19, robotic vehicle 20, and operator's helmet 30). Thus, the example of FIG. 2 is merely provided for ease of explanation of one example embodiment and should not be considered to be limiting with respect to the architecture of the system 10.

The robotic vehicles 20 (e.g., a demolition robot as illustrated in FIG. 1) may include a housing inside which a power unit or motor (not shown) is housed. In some embodiments, the power unit may be an electric motor an internal combustion engine, hydraulic system, pneumatic system, combustion chamber, or the like. The robotic vehicle 20 may each further include a work assembly (e.g., control arm 21 as illustrated in FIG. 1). The work assembly may be operated via the power unit to perform construction and/or demolition operations, such as drilling, cutting, hydraulic hammering, nailing, or the like. The robotic vehicle 20 may include sensors for location, device operation, orientation, or the like, as discussed below in reference to FIG. 3. Additionally or alternatively, each of the operations-devices (e.g., control device 19, robotic vehicle 20, and operator's helmet 30) may include location sensors and/or a user interface, as discussed below in reference to FIG. 3.

In an example embodiment, each of the operations-devices (e.g., control device 19, robotic vehicle 20, and operator's helmet 30) may include onboard circuitry 22 which may include or otherwise be embodied as a computing device (e.g., a computer, access terminal, processing circuitry, or the like) capable of communication with a network 35. As such, for example, each one of the operations-devices (e.g., control device 19, robotic vehicle 20, and operator's helmet 30) may include (or otherwise have access to) memory for storing instructions or applications for the performance of various functions and a corresponding processor for executing stored instructions or applications and a corresponding processor or processing circuitry. Each one of the operations-devices (e.g., control device 19, robotic vehicle 20, and operator's helmet 30) may also include software and/or corresponding hardware (e.g., the onboard circuitry 22) for enabling the performance of the respective functions as described below. In an example embodiment, one or more of the operations-devices (e.g., control device 19, robotic vehicle 20, and operator's helmet 30) may be configured to execute applications or functions implemented via software for enabling a respective one of the operations-devices (e.g., control device 19, robotic vehicle 20, and operator's helmet 30) to communicate with the network 35 for requesting and/or receiving information and/or services via the network 35 and/or for providing data to other devices via the network 35. The information or services receivable at the operations-devices (e.g., control device 19, robotic vehicle 20, and operator's helmet 30) may include deliverable components (e.g., downloadable software to configure the onboard circuitry 22 of the operations-devices 19,20,30, or information for consumption or utilization at the onboard circuitry 22 of the operations-devices 19,20,30).

The network 35 may be a data network, such as a local area network (LAN), a metropolitan area network (MAN), a wide area network (WAN) (e.g., the Internet), and/or the like, which may couple the devices (e.g., control device 19, robotic vehicle 20, and operator's helmet 30) to other devices such as processing elements (e.g., personal computers, server computers or the like) and/or databases. Communication between the network 35, the operations-devices (e.g., control device 19, robotic vehicle 20, and operator's helmet 30) and the other devices or databases (e.g., servers) to which the operations-devices (e.g., control device 19, robotic vehicle 20, and operator's helmet 30) are coupled may be accomplished by either wired or wireless communication mechanisms and corresponding communication protocols.

In an example embodiment, other devices to which the operations-devices (e.g., control device 19, robotic vehicle 20, and operator's helmet 30) may be coupled via the network 35 may include a server network 32 including one or more application servers (e.g., application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the operations-devices 19,20,30) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g., via the monitoring circuitry 44) may be the provision of services relating monitoring and/or determining operator awareness to mitigate or prevent operation of a robotic vehicle when the operator is not at least looking in the general direction of the robotic vehicle being controlled. For example, the application server 40 may be configured to receive data from one or more of the operations-devices (e.g., control device 19, robotic vehicle 20, and operator's helmet 30) and process the data to, for example, determine if the operators is watching the robotic vehicle during operation of the robotic vehicle and initiate one or more precautionary measures upon determining that the operator is not observant of the robotic vehicle. Thus, for example, the onboard circuitry 22 of any of the operations-devices (e.g., control device 19, robotic vehicle 20, and operator's helmet 30) may be configured to send the data (e.g., position data associated with location of the robotic vehicle, position data for the sensor network 15, etc.) to the application server 40 for the application server to initiate one or more precautionary measures (warning(s) and/or powering off of the robotic vehicle) upon determining that the operator is not observant of the robotic vehicle. In some embodiments, for example, the application server 40 may be configured to provide any of the operations-devices (e.g., control device 19, robotic vehicle 20, and operator's helmet 30) with instructions (e.g., for execution by the onboard circuitry 22) for taking prescribed actions (e.g., powering down, initiating warnings, etc.) when an operator's virtual line-of-sight vector and/or virtual sight area (e.g., each generated by processing circuitry 22 based on, at least in part, data from sensor network 15 as discussed in more detail below) do not intersect with the position of the robotic vehicle 20. However, in other cases, the onboard circuitry 22 could handle determinations locally and without assistance from the monitoring circuitry 44.

In some example embodiments, data from any of the operations-devices (e.g., control device 19, robotic vehicle 20, and operator's helmet 30) may be provided to and analyzed at the application server 40 (or at the onboard circuitry 22). In this regard, the application server 40 may, in accordance with an example embodiment, receive robotic-vehicle-positioning-information indicative of robotic vehicle position data of a robotic vehicle transiting a work area at one or more locations of the work area and receive operator-positioning-information indicative of operator position data of an operator controlling the robotic vehicle. In certain example embodiments, the monitoring circuitry 44 of the server network 32 may be configured to generate a virtual line-of-sight vector based on the operator-positioning-information, generate a virtual sight area based on the virtual line-of-sight vector and a predetermined sight area parameter (which may be input by a user either locally or remotely as discussed herein), and determine if the virtual sight area intersects with the robotic-vehicle-positioning-information. In some example embodiments, the monitoring circuitry 44 may further be configured to initiate one or more precautionary measures when the virtual sight area does not intersect with the robotic-vehicle-positioning-information. In some example embodiments, data from operations-devices (e.g., control device 19, robotic vehicle 20, and operator's helmet 30) may be provided to and analyzed at the application server 40 (e.g., in real time) to identify or define operating conditions related to, for example, the attentiveness (e.g., direction the operator is standing and/or the direction of the operator's head relative to the position of the robotic vehicle 20) of the operator controlling the robotic vehicle 20. Based at least on part on such data, for example, operating conditions may be associated or correlated to actions to be taken by the application server 40 in response to a future detection of such operating conditions if so desired. In some example embodiments, the application server 40 may then provide a report or warning or may direct action to be taken at one or more robotic vehicles 20 when an occurrence of the particular operating conditions is detected in the future (e.g., the virtual sight area does not intersect or encompass an area including the current position of the robotic vehicle 20). For example, recognition of the virtual sight area extending outwardly in a direction opposite of the location of the robotic vehicle 20 may be quickly recognized and in response to these recognized operating conditions, the operation of the robotic vehicle 20 may be halted as discussed herein. In still other embodiments, the operations-devices (e.g., control device 19, robotic vehicle 20, and operator's helmet 30) themselves may analyze such data. Based at least on part on such data, for example, operating conditions may be associated or correlated to actions to be taken by any one of the operations-devices (e.g., control device 19, robotic vehicle 20, and operator's helmet 30) in response to a future detection of such operating conditions if so desired. In some example embodiments, any one of the operations-devices (e.g., control device 19, robotic vehicle 20, and operator's helmet 30) may then provide a report or warning or may direct action to be taken at one or more robotic vehicles 20 when an occurrence of the particular operating conditions is detected in the future (e.g., the virtual sight area does not intersect or encompass an area including the current position of the robotic vehicle 20). For example, recognition of the virtual sight area extending outwardly in a direction opposite of the location of the robotic vehicle may be quickly recognized and in response to these recognized operating conditions, the operation of the robotic vehicle 20 may be halted as discussed herein. Thus, any one (or all) of the operations-devices (e.g., control device 19, robotic vehicle 20, and operator's helmet 30) may operate in some cases independently of the network 35 and the application server 40. However, in some cases, the application server 40 may be used to provide defined operating conditions and/or predetermined operating parameters (e.g., a predetermined sight area parameter, predetermined angle (as discussed below), etc.) to any one (or all) of the operations-devices (e.g., control device 19, robotic vehicle 20, and operator's helmet 30) and any one (or all) of the operations-devices (e.g., control device 19, robotic vehicle 20, and operator's helmet 30) may be configured thereafter to operate to detect operating conditions relative to predetermined operating parameters, and take actions correspondingly.

In some embodiments, for example, the onboard circuitry 22 and/or the monitoring circuitry 44 (e.g., positioning circuitry) may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 35 for the provision and/or receipt of information associated with performing activities as described herein.

FIG. 3 illustrates a block diagram showing components that may be associated with embodiment of the onboard circuitry 22 and/or the monitoring circuitry 44 according to an example embodiment. As shown in FIG. 3, the onboard circuitry 22 and/or the monitoring circuitry 44 may include or otherwise be embodied as an operator-awareness device 100. The operator-awareness device 100 may include processing circuitry 110 of an example embodiment as described herein. In this regard, for example, the operator-awareness device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g., operational parameters and/or location information) relating to a corresponding one of the operations-devices (e.g., control device 19, robotic vehicle 20, and operator's helmet 30). In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer on a device being monitored (e.g., one of the robotic vehicles 20), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g., function buttons), and/or other input/output mechanisms. In an example embodiment, the user interface 130 may include one or a plurality of lights, a display, a speaker, a tone generator, a vibration unit and/or the like.

The device interface 120 may include one or more interface mechanisms for enabling communication with other devices (e.g., sensors of the sensor network 140, or functional units of the operator-awareness device 100). In some cases, the device interface 120 may be any means such as a device or circuitry embodied in either hardware, or a combination of hardware and software that is configured to receive and/or transmit data from/to sensors in communication with the processing circuitry 110 via internal communication systems of the operator-awareness device 100. In some cases, the device interface 120 may further include wireless communication equipment (e.g., a one way or two way radio) for at least communicating information from the operator-awareness device 100 to a network and, in the case of a two way radio, in some cases receiving information from a network (e.g., network 35).

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the operator-awareness device 100 based on inputs received by the processing circuitry 110. As such, in some embodiments, the processor 112 (or the processing circuitry 110) may be said to cause each of the operations described in connection with the operator-awareness device 100 in relation to operation the operator-awareness device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140 (e.g., position sensors from the operations-devices, etc.), the operator-awareness device 100, or any other functional units that may be associated with the operator-awareness device 100. Among the contents of the memory 114, applications may be stored for execution by the processor 112 in order to carry out the functionality associated with each respective application. In some cases, the applications may include instructions for recognition of conditions in which the virtual sight area does not intersect with the robotic-vehicle-positioning-information and/or operator-inactivity as well as for initiating one or more precautionary measures in response to such recognition.

In some embodiments, the processing circuitry 110 may communicate with electronic components and/or sensors of the sensor network 140 (e.g., sensors that indicate positioning of the robotic vehicle, position sensors that are utilized to determine a virtual line-of-sight vector, sensors that measure variable values related to device operational parameters like RPM, temperature, oil pressure, seat presence, and/or the like, and/or sensors that measure device movement employing movement sensor circuitry) of the operations-devices (e.g., control device 19, robotic vehicle 20, and operator's helmet 30) via the device interface 120. In one embodiment, sensors of the sensor network 140 of one or more ones of the operations-devices (e.g., control device 19, robotic vehicle 20, and operator's helmet 30) may communicate with the processing circuitry 110 of a remote monitoring computer via the network 35 and the device interface 120 using wireless communication or by downloading data that is transferred using a removable memory device that is first in communication with operations-devices (e.g., control device 19, robotic vehicle 20, and operator's helmet 30) to load data indicative of operations-device activity, and is then (e.g., via the device interface 120) in communication with the remote monitoring computer (e.g., associated with the monitoring circuitry 44).

In some embodiments, the processing circuitry 110 may communicate with movement sensor circuitry of the, for example, robotic vehicle 20 (e.g., when the processing circuitry 110 is implemented as the onboard circuitry 22), or may receive information indicative of the robotic vehicle 20 location from movement sensor circuitry of one or more operations-devices (e.g., control device 19, robotic vehicle 20, and operator's helmet 30) being monitored (e.g., when the processing circuitry is implemented as monitoring/positioning circuitry 44). The movement sensor circuitry may include movement sensors (e.g., portions of the sensor network 140) such as one or more accelerometers and/or gyroscopes, or may include global positioning system (GPS) or other location determining equipment.

The movement sensor circuitry (if employed) may be configured to provide indications of movement of the operations-devices (e.g., control device 19, robotic vehicle 20, and operator's helmet 30) based on data provided by the one or more accelerometers and/or gyroscopes, and/or based on GPS or local position determining capabilities. In other words, the movement sensor circuitry may be configured to detect movement of the operations-devices (e.g., control device 19, robotic vehicle 20, and operator's helmet 30) based on inertia-related measurements or other location determining information. The indications may be provided to the operator-awareness device 100 to select and/or define instruction sets for initiation in response to a determination that the virtual sight area does not intersect with the robotic-vehicle-positioning-information and/or operator-inactivity (e.g., by determining operator position data relative to a change in time). In some embodiments, the movement sensor circuitry may utilize a carrier wave signal (e.g., the carrier associated with GPS satellite transmissions) in order to employ real time kinematic (RTK) satellite navigation techniques. RTK-GPS may employ phase measurements of the carrier wave (without regard for the content of such signals) in order to improve the accuracy of GPS positioning by employing carrier-phase enhancement. In some example embodiments, the movement sensor circuitry may include orientation sensors, configured to detect the orientation of an operations-device (e.g., control device 19, robotic vehicle 20, and operator's helmet 30).

In one example embodiment, an apparatus (e.g., control device 19, robotic vehicle 20, operator's helmet 30, monitoring circuitry 44) comprises processing circuitry (e.g., onboard circuitry 22 as shown in FIG. 2), as discussed herein, configured to receive robotic-vehicle-positioning-information indicative of robotic vehicle position data of a robotic vehicle transiting a work area at one or more locations of the work area and receive operator-positioning-information indicative of operator position data of an operator controlling the robotic vehicle. The processing circuitry, according to certain example embodiments, may further be configured to generate a virtual line-of-sight vector based on the operator-positioning-information and/or generate a virtual sight area based on the virtual line-of-sight vector and a predetermined sight area parameter. In certain example embodiments, the processing circuitry may further be configured to determine if the virtual sight area intersects with the robotic-vehicle-positioning-information (e.g., encompasses an area including the current position of the robotic vehicle). In accordance with certain example embodiments, the processing circuitry may be further configured to initiate one or more precautionary measures when the virtual sight area does not intersect with the robotic-vehicle-positioning-information. As noted previously, the robotic vehicle position data, the operator position data, or both may comprise GPS coordinates.

Figure 4A:
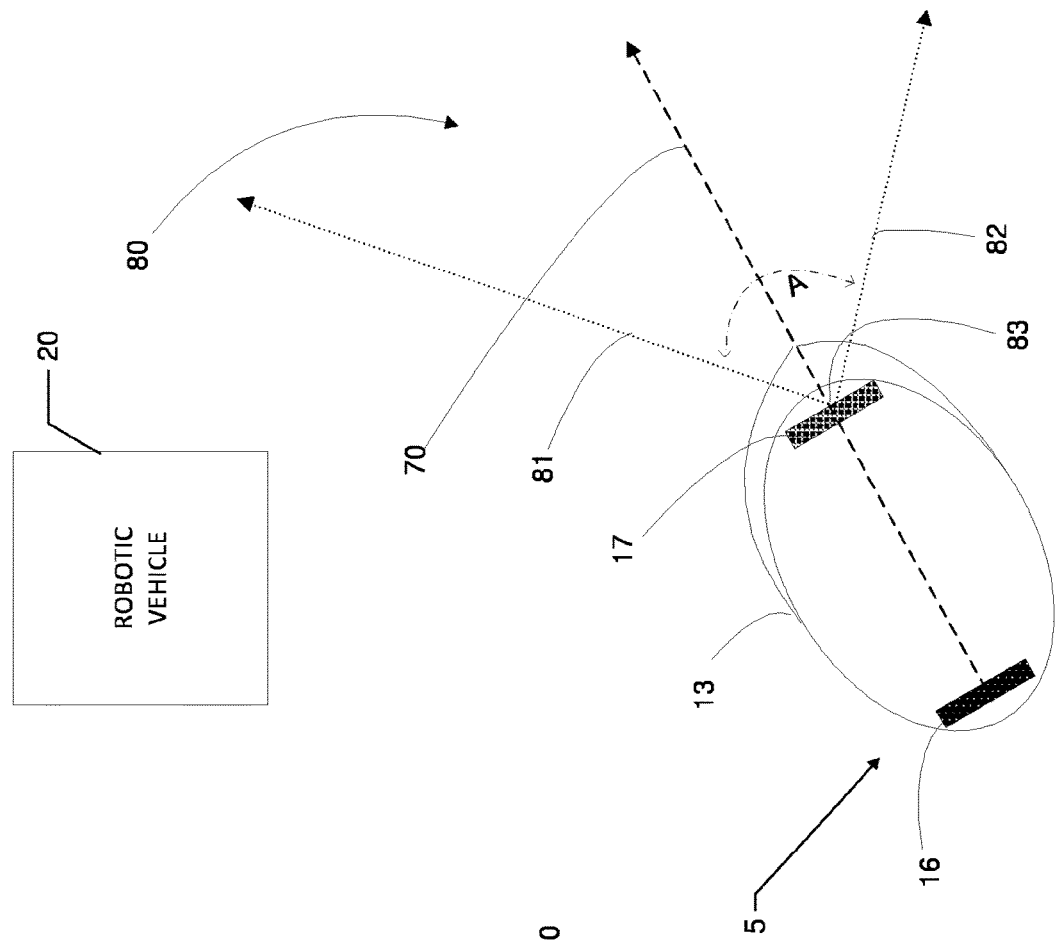
FIG. 4A illustrates a virtual line-of-sight vector and a virtual sight area, in which the virtual sight area intersects the positing of a robotic vehicle according to an example embodiment.
Figure 4B:
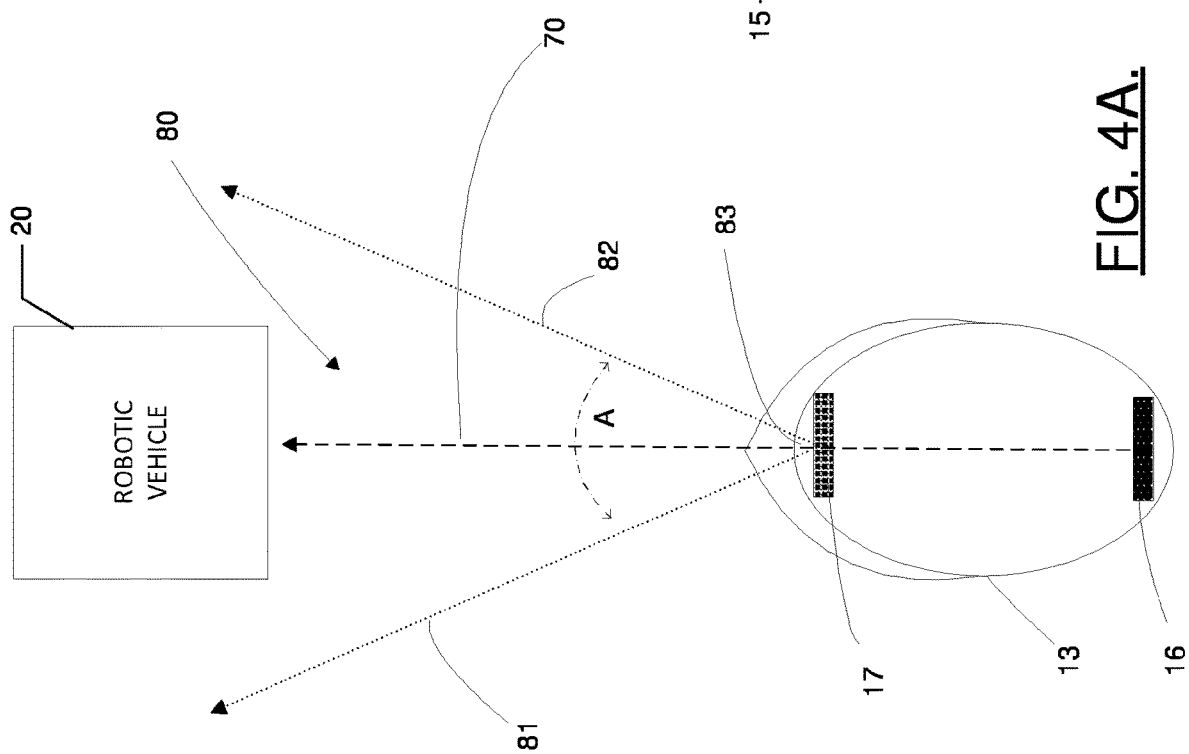
FIG. 4B illustrates a virtual line-of-sight vector and a virtual sight area, in which the virtual sight area does not intersect the positing of a robotic vehicle according to an example embodiment.

In accordance with certain example embodiments, the operator position data may comprise at least a first position data point associated with a front position sensor directly or indirectly attached to a front portion of the operator's headpiece and a second position data point associated with a rear position sensor directly or indirectly attached to a rear portion of the operator's headpiece. In some example embodiments, generation of the virtual line-of-sight vector may be defined by a virtual direction formed from the rear sensor through the front sensor. FIGS. 4A and 4B, for instance illustrate an operator headpiece 13 including a sensor network 15 comprising a front position sensor 17 and a rear position sensor 16, in which the virtual line-of-sight 70 is defined by a direction extending from the rear position sensor 16 through the front position sensor 17. As noted previously, the operator position data may be associated with an operator device (e.g., operator's shirt, vest, control device, etc.). In some example embodiments, the operator position data may comprise at least a first position data point associated with a front position sensor directly or indirectly attached to a front portion of the operator's control device and a second position data point associated with a rear position sensor directly or indirectly attached to a rear portion of the operator's control device. Generation of the virtual line-of-sight vector, for example, may be defined by a virtual direction formed from the rear sensor through the front sensor.

In accordance with certain example embodiments, processing circuitry of the apparatus (e.g., control device 19, robotic vehicle 20, operator's helmet 30, monitoring circuitry 44) may be further configured to receive the predetermined sight area parameter either remotely or locally at the apparatus. For example, the predetermined sight area parameter may be received wirelessly. In certain example embodiments, as shown in FIGS. 4A and 4B, the predetermined sight area parameter may comprise virtual boundary lines 81,82 and a virtual sight eye 83, in which the virtual boundary lines 81,82 extend outwardly from the virtual sight eye 83 at a predetermined angle (e.g., "A" in FIGS. 4A and 4B) there between. The predetermined angle (e.g., "A" in FIGS. 4A and 4B) can be input locally or remotely to the apparatus by an operator or user. In general, smaller values of the predetermined angle will require heightened operator awareness as the virtual sight area 80 will be reduced in size. As such, the operator will need to more squarely face the robotic vehicle 20 to prevent initiation of one or more precautionary measures by the processing circuitry of the apparatus. In this regard, the processing circuitry may be further configured to receive the predetermined angle either remotely or locally at the apparatus. The virtual sight eye 83, for example, may comprise a position (e.g., GPS coordinates) that may be associated with the front position sensor 17 to approximate the location of an operator's eyes. In this regard, the virtual sight eye 83 may be located at or proximate to the front position sensor 17. As noted above, the virtual boundary lines 81,82 may include a first boundary line 81 and a second boundary line 82 defining a two-dimensional virtual sight area 80. As noted above, the magnitude of the virtual sight area 80 can be varied by an operator or user by modifying the predetermined angle input.

In accordance with certain example embodiments, the predetermined sight area parameter may comprises a plurality of virtual boundary lines and a virtual sight eye, in which the plurality of virtual boundary lines extend outwardly at a predetermined angle between opposing individual virtual boundary lines from the virtual sight eye to define a three-dimensional virtual sight area. In one example embodiment, the three-dimensional virtual sight area may comprise a conical shape, in which the virtual sight eye comprises an apex of the conical shape. In some example embodiments, the virtual sight eye may be located at or proximate to the front position sensor. As noted previously, the processing circuitry may be configured to receive the predetermined angle between opposing individual virtual boundary lines either remotely (e.g., wirelessly) or locally at the apparatus.

FIG. 4A illustrates a virtual line-of-sight vector 70 and a virtual sight area 80, in which the virtual sight area 80 intersects the positing of a robotic vehicle 20 according to an example embodiment. In this regard, the operator's attentiveness to operation of the robotic vehicle 20 appears to be safe. FIG. 4B, however, illustrates a virtual line-of-sight vector 70 and a virtual sight area 80, in which the virtual sight area 80 does note intersect the positing of a robotic vehicle 20 according to an example embodiment. In this regard, the operator's attentiveness to operation of the robotic vehicle 20 may lead to unintended damage. In some example embodiments, the processing circuitry may determine that the virtual sight area 80 does not intersect or encompass the robotic-vehicle-positioning-information (as shown in FIG. 4B) and initiate one or more precautionary measures in response to such determination that the virtual sight area 80 does not intersect with the robotic-vehicle-positioning-information of the robotic vehicle 20. In some example embodiments, the one or more precautionary measures may comprise initiating a warning (e.g., a visual warning, an audio warning, a vibrating warning, or any combination thereof). In one example embodiment, the warning may comprise a vibrating warning comprises vibrating the operator's control device and/or headpiece. In addition or alternatively to initiating a warning, the one or more precautionary measures may comprise turning the power off to the robotic vehicle.

In accordance with certain example embodiments, the processing circuitry of the apparatus (e.g., control device 19, robotic vehicle 20, operator's helmet 30, monitoring circuitry 44) may be configured to determine operator-inactivity. In some example embodiments, the determination of operator-inactivity may comprise monitoring the operator position data with a change in time. For example, the operator position may be correlated relative to the passage of time to, for example, determine if the operator position moves periodically or simply remains stationary, which may be indicative of an operator simply placing the operator device (e.g., headpiece, control device, etc.) housing the position sensor network 15, as shown in FIG. 1, on a table or other stationary object in an attempt to circumvent systems according to certain example embodiments described herein. In this regard, the processing circuitry may be further configured to initiate the one or more precautionary measures when operator position data remains the same for a predetermined change in time (which may be input to the apparatus either locally or remotely by a user or operator). As noted above, the one or more precautionary measures may comprise initiating a warning (e.g., a visual warning, an audio warning, a vibrating warning, or any combination thereof). In addition or alternatively to initiating a warning, the one or more precautionary measures may comprise turning the power off to the robotic vehicle.

Figure 5:
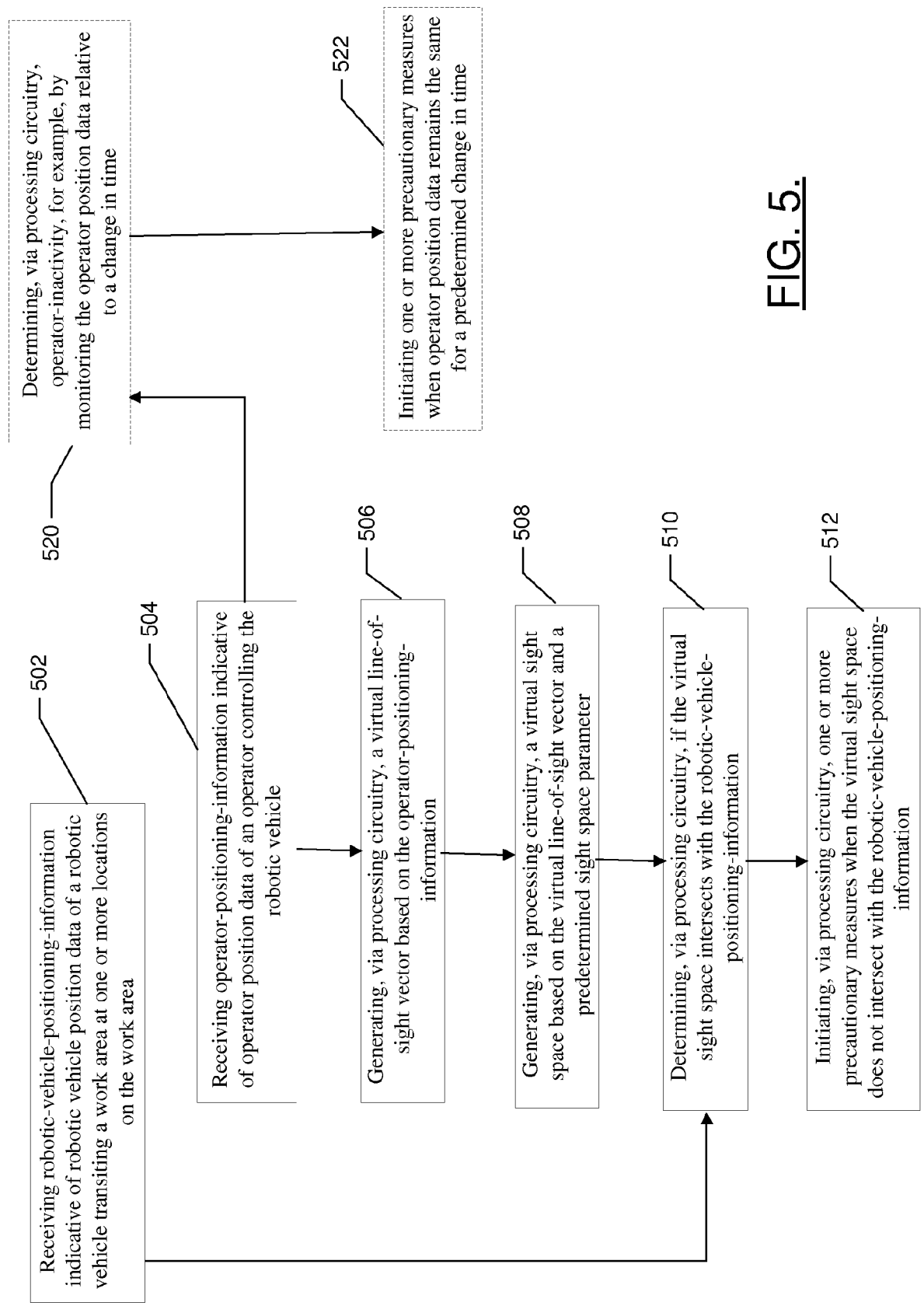
FIG. 5 illustrates a block diagram of a method according to an example embodiment.

In some cases, a method of operating a robotic vehicle (e.g., a demolition robot) utilizing operator-awareness device 100 in relation to operation of the robotic vehicle is provided. In this regard, the method may utilize an apparatus such as a robotic vehicle (e.g., a demolition robot) or an operator device (e.g., an operator headpiece, operator shirt, operator vest, operator control device, etc.) while monitoring and/or determining operator awareness is provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the robotic vehicle(s) according to the method.

In an example embodiment, the method may include receiving robotic-vehicle-positioning-information indicative of robotic vehicle position data of a robotic vehicle transiting a work area at one or more locations on the work area at operation 502, receiving operator-positioning-information indicative of operator position data of an operator controlling the robotic vehicle at operation 504, generating, via processing circuitry, a virtual line-of-sight vector based on the operator-positioning-information at operation 506, generating, via processing circuitry, a virtual sight area based on the virtual line-of-sight vector and a predetermined sight area parameter at operation 508, determining, via processing circuitry, if the virtual sight area intersects with the robotic-vehicle-positioning-information, based at least in part on data from operation 502, at operation 510, and initiating, via processing circuitry, one or more precautionary measures when the virtual sight area does not intersect with the robotic-vehicle-positioning-information. As shown in FIG. 5, one example embodiment may include determining, via processing circuitry, operator-inactivity by monitoring the operator position data from operation 504 relative to a change in time at operation 502, and initiating one or more precautionary measures when operator position data remains the same for a predetermined change in time at operation 522. Operations 520 and 522 are each shown in dashed lines in FIG. 5 to highlight the fact that these operations may be optional.

In some embodiments, the method may include additional, optional operations, and/or the operations described above may be modified or augmented. Some examples of modifications, optional operations and augmentations are described below. In this regard, for example, in some cases, (1) generating the virtual line-of-sight vector comprises defining a virtual direction formed from the rear sensor through the front sensor; (2) generating the virtual line-of-sight vector comprises defining a virtual direction formed from the rear sensor through the front sensor; (3) receiving the predetermined sight area parameter either remotely or locally (e.g., wirelessly); and (4) receiving a predetermined angle between virtual boundary lines extending outwardly from a virtual sight eye. In some method embodiments, any or all of (1) to (4) may be employed to provide operator awareness. In an example embodiment, an apparatus (e.g., control device 19, robotic vehicle 20, operator's helmet 30, monitoring circuitry 44) may be provided with processing circuitry configuring the apparatus (e.g., control device 19, robotic vehicle 20, operator's helmet 30, monitoring circuitry 44) to perform any of the example embodiments as described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. An apparatus comprising a processing circuitry configured to:
   receive robotic-vehicle-positioning-information indicative of robotic vehicle position data of a robotic vehicle transiting a work area at one or more locations of the work area;
   receive operator-positioning-information indicative of operator position data of an operator controlling the robotic vehicle;
   generate a virtual line-of-sight vector that originates from a device located at the operator based on the operator-positioning-information;
   generate a virtual sight area that originates from the device located at the operator based on the virtual line-of-sight vector and a predetermined sight area parameter;
   determine if the virtual sight area intersects with the robotic-vehicle-positioning-information; and
   initiate one or more precautionary measures when the virtual sight area does not intersect with the robotic-vehicle-positioning-information.

2. The apparatus of claim 1, wherein the robotic vehicle position data, the operator position data, or both comprise GPS coordinates.

3. The apparatus of claim 1, wherein the device located at the operator is an operator's headpiece, and
   wherein the operator position data comprises at least a first position data point associated with a front position sensor directly or indirectly attached to a front portion of the operator's headpiece and a second position data point associated with a rear position sensor directly or indirectly attached to a rear portion of the operator's headpiece; and generation of the virtual line-of-sight vector is defined by a virtual direction formed from the rear position sensor through the front position sensor.

4. The apparatus of claim 1, wherein the device located at the operator is an operator's control device, and
   wherein the operator position data comprises at least a first position data point associated with a front position sensor directly or indirectly attached to a front portion of the operator's control device and a second position data point associated with a rear position sensor directly or indirectly attached to a rear portion of the operator's control device; and generation of the virtual line-of-sight vector is defined by a virtual direction formed from the rear position sensor through the front position sensor.

5. The apparatus of claim 1, wherein the processing circuitry is further configured to receive the predetermined sight area parameter either remotely or locally at the apparatus.

6. The apparatus of claim 5, wherein receiving the predetermined sight area parameter remotely comprises receiving the predetermined sight area parameter wirelessly.

7. The apparatus of claim 3, wherein the predetermined sight area parameter comprises virtual boundary lines and a virtual sight eye, the virtual boundary lines extending outwardly from the virtual sight eye at a predetermined angle therebetween.

8. The apparatus of claim 7, wherein the virtual boundary lines include a first boundary line and a second boundary line defining a two-dimensional virtual sight area.

9. The apparatus of claim 7, wherein the virtual sight eye is located at or proximate to the front position sensor.

10. The apparatus of any of claim 7, wherein the processing circuitry is further configured to receive the predetermined angle either remotely or locally at the apparatus.

11. The apparatus of claim 10, wherein receiving the predetermined angle remotely comprises receiving the predetermined angle wirelessly.

12. The apparatus of claim 1, wherein the predetermined sight area parameter comprises a plurality of virtual boundary lines and a virtual sight eye, the plurality of virtual boundary lines extending outwardly at a predetermined angle between opposing individual virtual boundary lines from the virtual sight eye to define a three-dimensional virtual sight area.

13. The apparatus of claim 12, wherein the three-dimensional virtual sight area comprises a conical shape, wherein the virtual sight eye is disposed at an apex of the conical shape.

14. The apparatus of claim 1, wherein the one or more precautionary measures comprises initiating a warning as a visual warning, an audio warning, a vibrating warning, or any combination thereof.

15. The apparatus of claim 14, wherein the vibrating warning comprises vibrating the operator's control device, or
   wherein the vibrating warning comprises vibrating the operator's headpiece.

16. The apparatus of claim 1, wherein the processing circuitry is further configured to determine operator-inactivity.

17. The apparatus of claim 16, wherein the determination of operator-inactivity comprises monitoring the operator position data with a change in time.

18. The apparatus of claim 17, wherein the processing circuitry (110) is further configured to initiate the one or more precautionary measures when operator position data remains the same for a predetermined period of time.

19. The apparatus of claim 18, wherein the one or more precautionary measures comprises initiating a warning or turning the power off on the robotic vehicle, and wherein the robotic vehicle comprises a demolition robot.

20. A method, comprising:
- receiving robotic-vehicle-positioning-information indicative of robotic vehicle position data of a robotic vehicle transiting a work area at one or more locations on the work area;
- receiving operator-positioning-information indicative of operator position data of an operator controlling the robotic vehicle;
- generating, via processing circuitry, a virtual line-of-sight vector that originates from a device located at the operator based on the operator-positioning-information;
- generating, via processing circuitry, a virtual sight area that originates from the device located at the operator based on the virtual line-of-sight vector and a predetermined sight area parameter;
- determining, via processing circuitry, if the virtual sight area intersects with the robotic-vehicle-positioning-information; and
- initiating, via processing circuitry, one or more precautionary measures when the virtual sight area does not intersect with the robotic-vehicle-positioning-information.

* * * * *